June 29, 1965 R. M. WALKER ETAL 3,192,489

ORTHOGONAL HYBRID T FOR MICROWAVE WAVEGUIDES

Filed Sept. 15, 1961 3 Sheets-Sheet 1

INVENTORS
RICHARD M. WALKER
NICHOLAS P. KERNWEIS
BY
ATTORNEY

INVENTORS
RICHARD M. WALKER
NICHOLAS P. KERNWEIS
BY
ATTORNEY

ORTHOGONAL HYBRID T FOR MICROWAVE WAVEGUIDES

Filed Sept. 15, 1961 3 Sheets-Sheet 3

INVENTORS
RICHARD M. WALKER
NICHOLAS P. KERNWEIS
BY
ATTORNEY

United States Patent Office 3,192,489
Patented June 29, 1965

3,192,489

ORTHOGONAL HYBRID T FOR MICROWAVE WAVEGUIDES

Richard M. Walker, Roxbury, and Nicholas P. Kernweis, Arlington, Mass., assignors to Microwave Associates, Inc., Burlington, Mass., a corporation of Massachusetts
Filed Sept. 15, 1961, Ser. No. 138,509
8 Claims. (Cl. 333—11)

This invention relates to hybrid T junctions in rectangular microwave waveguides, and more particularly to such junctions having pairs of arms extending from a common junction region and lying in only two orthogonally related planes, and capable of being realized in smaller sizes than have heretofore been possible.

A conventional magic T in rectangular waveguide is useful as a hybrid T junction. This device, however, consists of an H-plane T and E-plane T formed at the same point of a waveguide (Microwave Transmission Circuits, Ragan, McGraw-Hill Book Co., Inc. (1948) page 706, FIG. 10–100*a*), and has four arms extending in four different respective directions from the junction point. Three of these directions are orthogonally related. For these reasons, the magic T is a bulky configuration, especially when the arms are made long enough to permit access to mounting flanges at the ends of all of them. Similar considerations apply to the so-called "folded" T form of magic T.

It is an object of the present invention to provide a hybrid T junction in rectangular waveguide which can be realized in smaller sizes than a magic T junction in the same size waveguide. It is another object to provide such an improved hybrid T junction which will have a wide bandwidth, that is, a low VSWR at each arm over the useful bandwidth of the waveguide being used. Thus, in $X_S$ band waveguide, for example, it is an object of the invention to achieve a VSWR $<1.10$ for both E-arm and H-arm inputs over the bandwidth 8.2–11.0 kmc./sec. (approximately). A further object of the invention is to provide such an improved hybrid T junction which can be made in a simple and rugged structure, which can be readily incorporated in a waveguide run, in a small space, and which requires no unusual manufacturing techniques or tolerances. It is a specific object of the invention to provide a waveguide hybrid T junction having four rectangular waveguide arms having pairs lying in only two orthogonally related axes.

According to the invention, there is provided a waveguide junction having four arms or branches each extending from a common junction region to a separate terminal, in which the longitudinal axes of two of the arms lie in a first plane and the longitudinal axes of the remaining two arms lie in a second plane orthogonal to the first plane. The arms having their axes in one plane may be side-by-side, either parallel or at an angle, such as an acute angle, to each other. The junction region encompasses the ends of these two arms at which the apex of such an angle is formed. The remaining two arms may at the same time be collinear, extending, respectively, in opposite directions from the junction region. These latter two arms have a common axis and are disposed relative to each other substantially 90° electrically about the common axis, so that they may constitute, one an E-plane arm, and the other an H-plane arm, relative to the first two arms.

According to certain embodiments of the invention, first and second rectangular waveguides are disposed side-by-side, either parallel to or making an acute angle with each other, have an end of each terminating in a junction space, to which third and fourth waveguides on a common axis are connected. The third and fourth waveguides extend in opposite directions from the junction space, and their common axis is perpendicular to the axis of either of the first and second waveguides. The third and fourth guides open into the junction space and through it communicate with the first and second guides. The third guide is oriented about its longitudinal axis to propagate only transverse electric waves mutually out of phase respectively in the first and second guides, while the fourth guide is oriented about its longitudinal axis to propagate only transverse electric waves mutually in phase in the first and second guides. The junction space is otherwise fully enclosed, and may include phase control and impedance adjusting means.

According to specific embodiments of the invention, the first and second rectangular waveguides may share a common wide wall when parallel to each other, or they may share a common narrow wall when parallel to each other.

Other and further objects, features and advantages of the invention will become apparent from the following description of certain embodiments thereof. This description refers to the accompanying drawings, wherein:

FIG. 1 schematically illustrates the structural arrangement of one embodiment of the invention;

Figure 13:
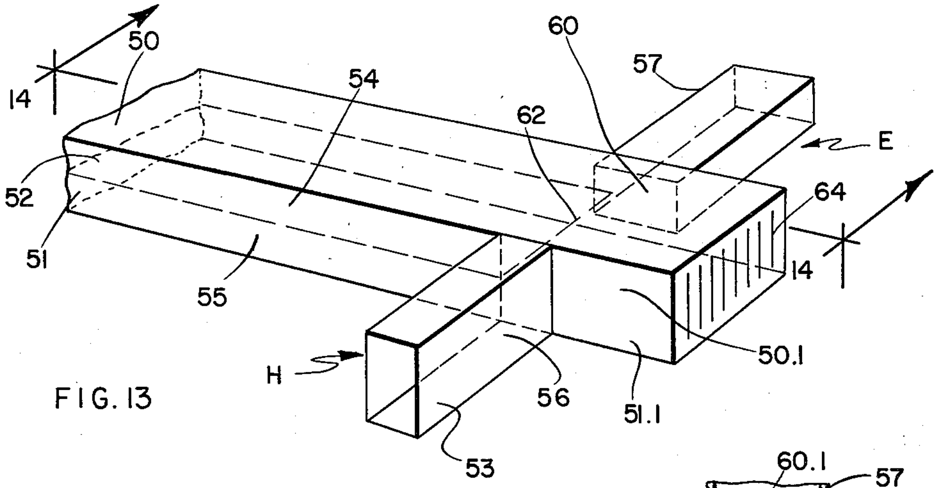
Figure 14:
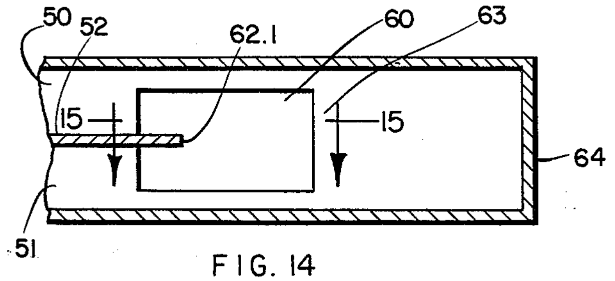
Figure 15:
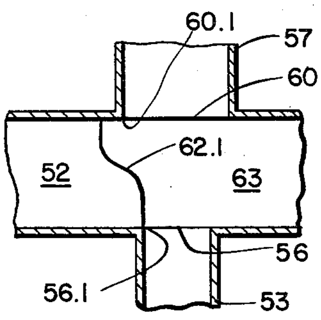
Figures 16, 17, 18, 19:
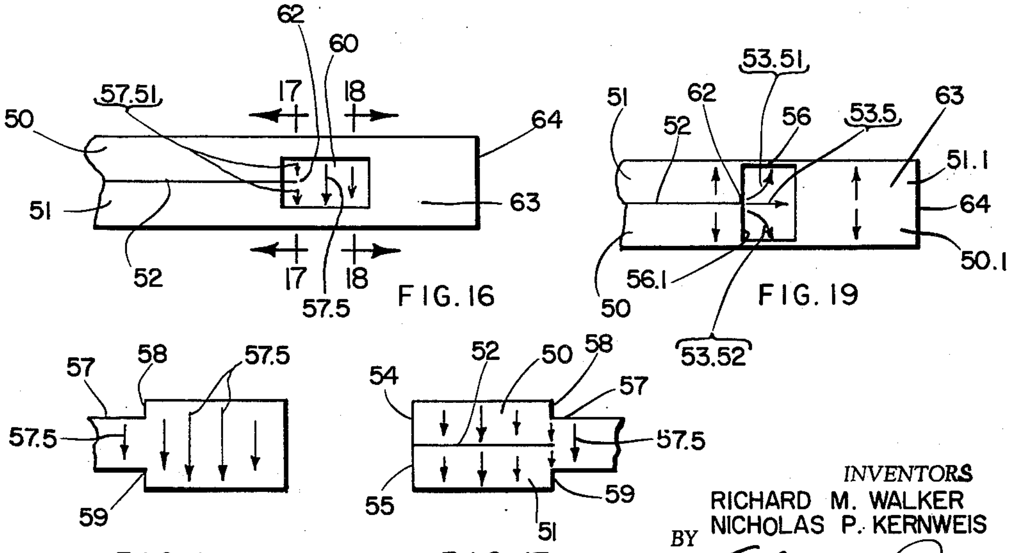

FIG. 13 schematically illustrates the structural arrangement of another embodiment of the invention;

FIG. 14 is a side view along line 14—14 in FIG. 13 of an embodiment of the invention according to the arrangement of FIG. 13;

FIG. 15 is a partial top sectional view taken along line 15—15 of FIG. 14;

FIGS. 16, 17 and 18 are schematic illustrations of the operational characteristics of the E-plane arm of embodiments according to FIG. 13; and FIG. 19 is a schematic illustration of the operational characteristics of the H-plane arm of embodiments according to FIG. 13.

Figure 1:
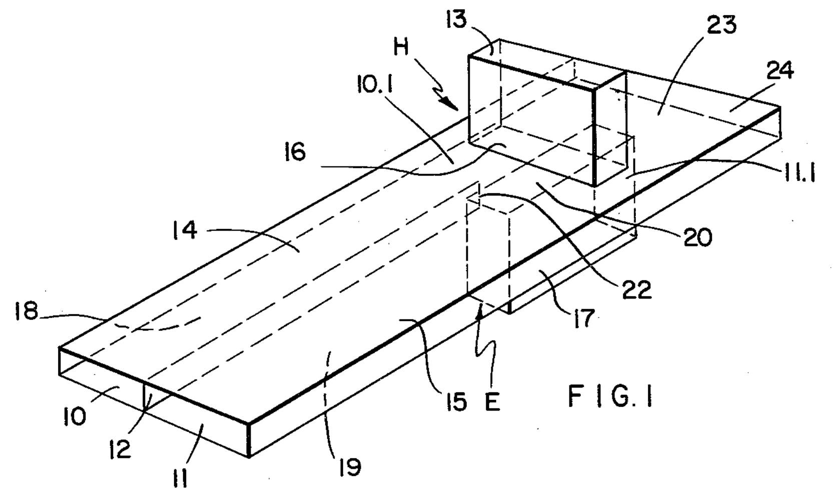

Referring now to FIGS. 1–4, inclusive, FIG. 1 shows the general schematic arrangement of four rectangular waveguides in a hybrid T junction according to the invention. First and second rectangular waveguides 10 and 11, respectively, are joined in a single structure with a septum 12 forming a common narrow wall. It will be understood that the guides 10 and 11 may have separate narrow walls, and may be disposed at an acute angle to each other. A third rectangular waveguide 13 is mounted on one pair 14, 15 of the adjacent non-common coplanar wide walls of the ends of the first and second guides 10 and 11, respectively, at the same said ends, 10.1 and 11.1, respectively, with its broad or wide walls perpendicular to the septum 12, and opening into the first and second guides 10 and 11 through an opening 16. This opening is rectangular and lies equal distances on either side of the septum 12, with its larger dimension transverse to the axes of both of the first and second guides 10 and 11. As so disposed, the third rectangular waveguide 13 may be termed the "H-plane arm" of the configuration hown.

A fourth rectangular waveguide 17 is mounted on the remaining pair 18, 19 of the adjacent non-common coplanar wide walls of the same ends 10.1 and 11.1, respectively, of the first and second guides 10 and 11, respectively, on a common longitudinal axis with the H-plane arm 13 but with its broad walls at right angles to the broad walls of the H-plane arm, and opening into the first and second guides through an opening 20 in said coplanar wide walls. This opening is rectangular and lies equal distances on either side of the septum 12, with its longer dimension parallel to the axes of the first and second guides 10 and 11. As so disposed, the fourth rectangular waveguide 17 may be termed the "E-plane arm" of the configuration shown.

The septum 12 terminates at an edge 22 near the ends 10.1 and 11.1 of the first and second guides, which edge is spaced (see FIG. 2) a distance L from the common axis of the E-plane and H-plane arms 17 and 13, respectively, and a distance D from the nearer transverse edge of the E-plane arm 17, thereby providing an open chamber 23 in the junction region between the E-plane and H-plane arms, comprised of the ends 10.1 and 11.1 of the first and second guides 10 and 11 without a common narrow wall. The outer end 24 of this chamber is provided with a common closure, as will be more fully explained.

Figures 2, 3:
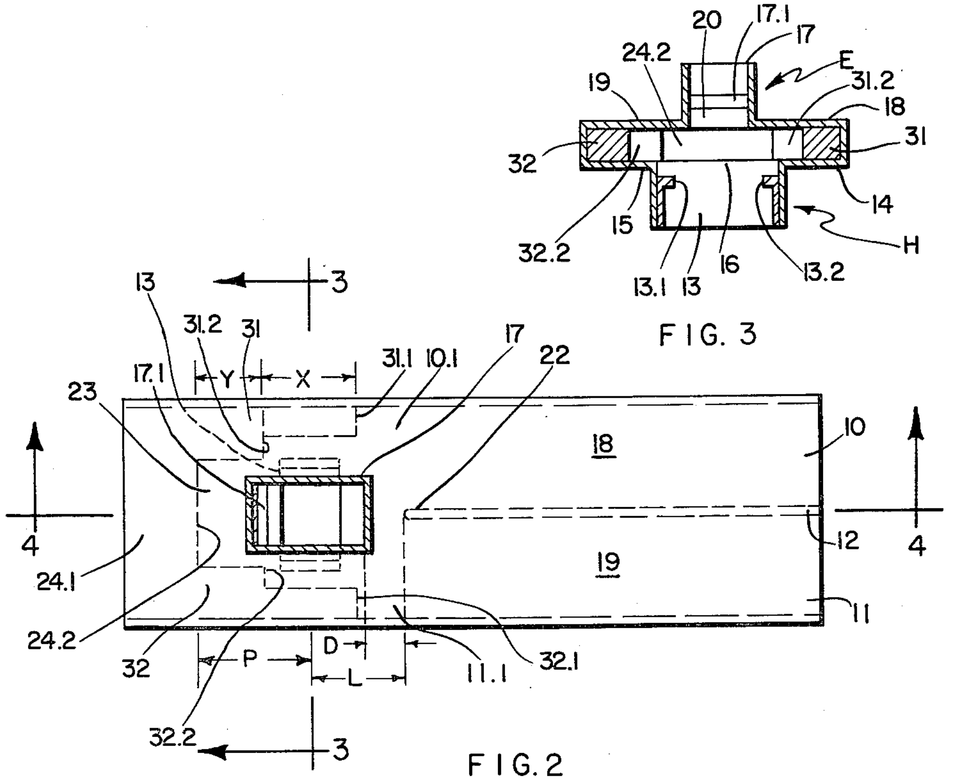
FIG. 2 is a top plan view of an embodiment of the invention according to the arrangement of FIG. 1.
FIG. 3 is a section along line 3—3 of FIG. 2.
Figure 4:
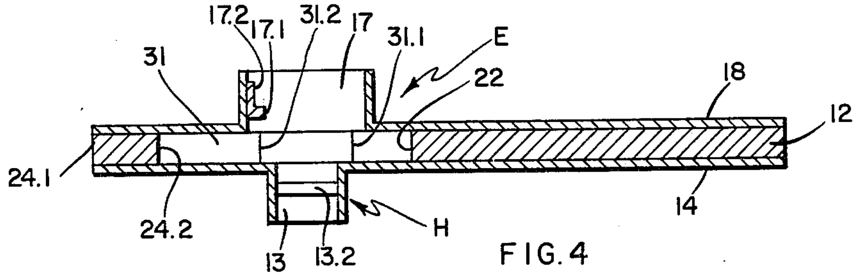
FIG. 4 is a section along line 4—4 of FIG. 2.
Figure 5:
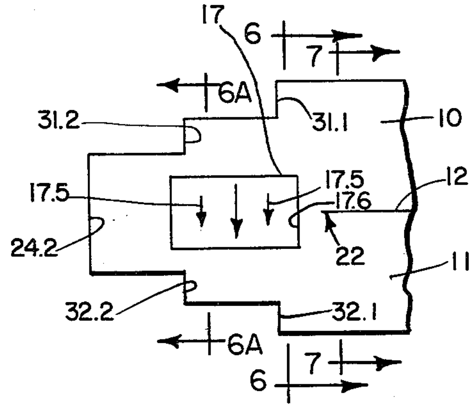
FIGS. 5, 6, 6A and 7 are schematic illustrations of the operational characteristics of the E-plane arm of the embodiment illustrated in FIG. 2.

FIGS. 2, 3, and 4 show, in greater detail than FIG. 1, an actual embodiment of the invention. In these figures, parts corresponding to parts shown in FIG. 1 bear the same reference characters. The common closure 24.1 for the chamber 23 has an inner surface 24.2 which is spaced a distance P from the common axis of the E-plane and H-plane arms 17 and 13, respectively, on the opposite side thereof from the septum edge 22. The chamber 23 is also provided with impedance transformer means in the form of stepped conductive transformer inserts 31 and 32, one at each outer narrow wall of the chamber, which may be arms integral with the closure member 24.1, or may be separate pieces. These transformer inserts are each the full height of the waveguide in which it is disposed, and each increases stepwise in width, presenting two stepped surfaces 31.1 and 31.2, for the first insert 31, and 32.1 and 32.2, for the second insert 32, respectively. The distance X between the two stepped surfaces of each transformer insert, in the direction of the axes of the first and second guides 10 and 11, is adjusted to minimize reflections therefrom in the first and second guides, as will be more fully explained. The transformer inserts 31 and 32 alter the wide ($a$) dimension of the chamber 23, progressively reducing it step-wise toward the inner closure surface 24.2. The H-plane arm 13 is provided with iris elements 13.1 and 13.2; one on each narrow wall thereof. The E-plane arm 17 is provided with one iris element 17.1 on the narrow wall thereof nearer the closure surface 24.2.

Figure 6:
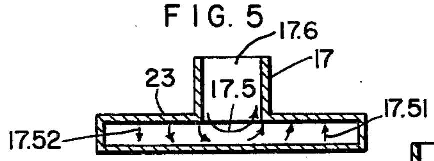
Figure 6A:
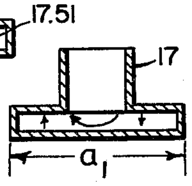
Figure 7:
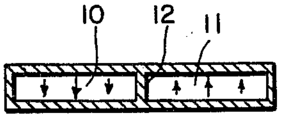
Figure 11:
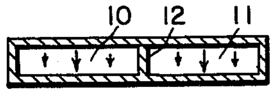

Referring to FIGS. 5, 6, 6A and 7, assuming that $TE_{01}$ mode energy is propagating in the E-plane arm 17, as indicated by the voltage vector arrows 17.5, this energy will generate the $TE_{02}$ mode in the chamber 23, as is indicated by the outermost voltage vector arrows 17.51 and 17.52, respectively. The chamber 23 is a rectangular waveguide having three sections in which the width or "$a$" dimension is different owing to the transformer steps 31.1, 31.2 and 32.1, 32.2, respectively. The height or "$b$" dimension is the same in all three sections, being the same as that of the first and second rectangular waveguides 10 and 11, respectively. The "$a$" dimension of the chamber 23 is twice that of either of the first and second guides, in the widest section between the septum edge 22 and the nearer steps 31.1 and 32.1 of the impedance transformer. This "$a$" dimension is reduced by the combined width of these two steps in the intermediate section between these two steps and the remaining two steps 31.2 and 32.2 of the transformer, to a magnitude "$a_1$," as indicated in FIG. 6A. It is further reduced by the combined width of the latter two steps in the narrowest section between these two steps and the inner closure surface 24.2. Considering that the first and second waveguides 10 and 11 have their "$a$" dimension chosen to favor propagation of the fundamental rectangular mode $TE_{01}$, and to be beyond cut-off for the higher order modes, such as the $TE_{02}$, in the operating frequency band, according to recognized engineering and operating standards, the $TE_{02}$ mode energy which is generated near the narrow side 17.6 of the E-plane arm which opens into the widest section of the chamber 23 can propagate in the widest section because that section has a width dimension "$a$" which is twice the width dimension of either of the first and second guides, as shown in FIG. 6, and thus satisfies the condition that to propagate the $TE_{02}$ mode and the $TE_{01}$ mode at the same frequency the "$a$" dimension must be double the cut-off value for the fundamental mode. Such energy will not propagate in the intermediate and narrowest sections of the impedance transformer, however because the width dimension "$a$" of the intermediate section is to small. Therefore the E-plane arm does not propagate energy toward the closure wall 24.2, in the direction looking into the section of FIG. 6A, but does propagate the $TE_{02}$ mode toward the first and second guides 10 and 11, as shown in FIG. 6. The electric field of this mode at the locus of the septum 12 being zero, this mode becomes two mutually out-of-phase $TE_{01}$ mode waves propagating, respectively, one in each of the first and second guides, as shown in FIG. 7.

Figure 8:
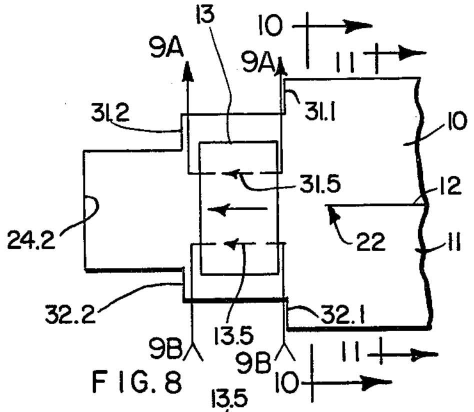
FIGS. 8, 9, 10 and 11 are schematic illustrations of the operational characteristics of the H-plane arm of the embodiment illustrated in FIG. 2.
Figure 9:
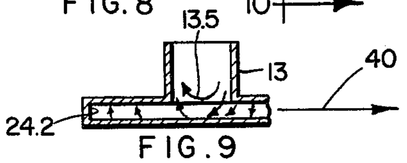
Figure 10:
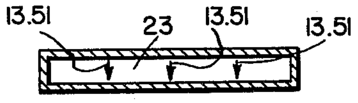

Referring to FIGS. 8, 9, 10 and 11, and assuming that $TE_{01}$ mode energy is propagating in the H-plane arm 13, as indicated by the voltage vector arrows 13.5, this energy will generate $TE_{01}$ mode energy in one phase looking toward the closure wall surface 24.2, and $TE_{01}$ mode energy in the opposite phase looking toward the first and second guides 10 and 11, as indicated by the arrow 40 in FIG. 9, and by the voltage vector arrows 13.51 in FIG. 10, which is a section along line 10—10 of FIG. 8. FIG. 9 is a section along line 9A—9A or line 9B—9B of FIG. 8, both looking in the same direction, but respectively at opposite sides of the H-plane arm 13. However, by spacing the closure wall 24.2 $\lambda g./2$ away (approximately), for the $TE_{01}$ mode, from the common longitudinal axis of the H-plane and E-plane arms 13 and 17, respectively, the closed end of the chamber 23 will behave like a shorted half-wave stub of rectangular waveguide and will present substantially zero impedance at the junction with the H-plane arm, and energy from the H-plane arm will be propagated only toward the first and second waveguides 10 and 11, as shown in FIG. 10. Accordingly, the dimension P in FIG. 2 is chosen to be substantially $\lambda g./2$ for the $TE_{01}$ mode energy from the H-plane arm 13.

The $TE_{01}$ mode has a voltage maximum intermediate the narrow walls of the waveguide in which it propagates. If the septum 12 were immediately contiguous with an edge of the H-plane arm, it would provide a short circuit distorting the wave pattern of and causing impedance mismatch with the wave being launched from the H-plane arm. We have discovered that if the leading edge 22 of the septum 12 is located approximately $\lambda g./2$ for the $TE_{01}$ mode from the common axis of the H-plane and E-plane arms 13 and 17, respectively, or approximately $\lambda g./4$ for the $TE_{01}$ mode from the nearer narrow side of the E-plane arm 17, such distortion and mismatch can be reduced to the extent that a VSWR less than 1.10 can be achieved over a wide band of frequencies, for example, 8.2 to 10.8 mc./sec., in the $X_S$ band. Accordingly, we prefer to choose the dimension L in FIG. 2 to be $\lambda g./2$ (approximately) for the $TE_{01}$ mode, and the dimension D to be $\lambda g./4$ (approximately) for the same mode.

The steps 31.1, 31.2 and 32.1, 32.2 of each side of the transformer section, respectively, are spaced apart $\lambda g./4$ for the $TE_{01}$ mode in order to effect cancellation of reflections therefrom of any energy in that mode which may propagate in the transformer sections. Recalling that for the fundamental mode the closure wall 24.2 is electrically effectively in the same plane as the steps 31.2 and 32.2 nearer to it, it will be seen that only reflections from these two sets of steps need be considered. Also, since the $TE_{02}$ mode will not propagate in the transformer sections, only the $TE_{01}$ mode need be considered in its design.

The transformer varies the wide, or *"a"* dimension to adjust the impedance of the chamber 23 to the E-plane and H-plane arms. A set of dimensions suitable for a junction according to the invention, for use in the $X_S$ band, (approximately 8–12 kmc./sec.) is as follows.

| | Inch |
|---|---|
| Inside dimensions of the H-plane arm **13** and E-plane arm **17**— | |
| Width (*a*) | 0.900 |
| Height (*b*) | 0.450 |
| Inside dimensions of the first and second waveguides **10** and **11**— | |
| Width (*a*) | 0.900 |
| Height (*b*) | 0.225 |

Figure 12:
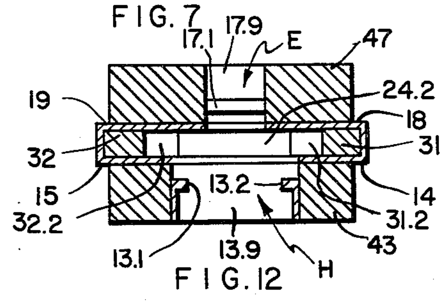
FIG. 12 is a section similar to FIG. 3 showing certain modifications of the embodiment of FIG. 2.

In this case, we used "half-height" guide for the first and second guides, because this choice provided two advantages, namely:

(i) Using reduced height (e.g. half-height) guide in the output arms 10 and 11 and standard guide in the E and H arms 17, 13, improved impedance matching conditions in the E-plane arm; and (ii) It enabled us to reduce the total length of the device in the direction of the common longitudinal axis of the H- and E-plane arms as will become more apparent from the discussion of FIG. 12 which follows.

| | Inch |
|---|---|
| Thickness of the septum **12** (approx.) | 0.050 |
| Dimension P (FIG. 2) | 0.710 |
| Dimension X (FIG. 2) | 0.560 |
| This was divided as follows: | |
| (i) From the transverse plane including the common axis of the H- and E-plane arms to the common plane including the forward steps **31.1** and **32.1** | 0.170 |
| (ii) From said first-named plane to the common plane including the intermediate steps **31.2** and **32.2** | 0.390 |
| Dimension Y (FIG. 2), from the forward transformer step **31.1** or **32.1** to the intermediate step **31.2** or **32.2**, respectively | 0.320 |
| Dimension D (FIG. 2) | 0.450 |
| Dimension L (FIG. 2) (approx.) | 0.900 |
| Dimension *"a"* of chamber **23** between the inner edge **22** of the septum **12** and the forward transformer steps **31.1** and **32.1** | 1.850 |
| Dimension *"a"* (FIG. 6) of the first impedance transformer section | 1.490 |
| Dimension *"a"* of the second, or narrower transformer section (between the inner closure wall **24.2** and the intermediate steps **31.2** and **32.2**) | 0.900 |
| Axial length of the H-plane arm **13** | 0.750 |
| Axial length of the E-plane arm **17** | 0.750 |

The iris elements 13.1 and 13.2 in the H-plane arm 13, and 17.1 in the E-plane arm 17, were dimensioned according to known techniques for impedance matching of these arms. Thus, in the present example, the iris element 13.1 and 13.2 in the H-plane arm 13 projected into the guide approximately 0.102 inch, and were each approximately 0.102 inch wide in the axial direction of the guide; each was centered (referring to its cross section as seen in FIG. 3) about 0.300 inch from the plane mid-way between the wide walls 14, 15 and 18, 19, respectively, of the first and second guides 10 and 11. Similarly, the iris element 17.1 in the E-plane arm 17 projected into the guide 0.130 inch, was about 0.035 inch wide in the axial direction of the guide, and was centered (as seen in FIG. 4) about 0.314 inch from said mid-plane. The side flange 17.2 of this element was about 0.032 inch thick and 0.318 inch high, as seen in FIG. 4.

VSWR data was taken on a device having the foregoing dimensions, by introducing microwave energy in the frequency band 8.2 to 10.6 kmc./sec., first into the H-plane arm 13, and then into the E-plane arm 17, and measuring the VSWR in each of these arms, with the following results:

*Table I*

| Input Freq., Kmc./sec. | VSWR | |
|---|---|---|
| | H-plane Arm | E-plane Arm |
| 8.2 | 1.09 | 1.16 |
| 8.3 | 1.06 | 1.09 |
| 8.4 | 1.05 | 1.055 |
| 8.5 | 1.07 | 1.04 |
| 8.6 | 1.08 | 1.05 |
| 8.7 | 1.07 | 1.08 |
| 8.8 | 1.05 | 1.11 |
| 8.9 | 1.06 | 1.11 |
| 9.0 | 1.10 | 1.08 |
| 9.1 | 1.12 | 1.04 |
| 9.2 | 1.12 | 1.06 |
| 9.3 | 1.08 | 1.12 |
| 9.4 | 1.05 | 1.16 |
| 9.5 | 1.055 | 1.18 |
| 9.6 | 1.07 | 1.15 |
| 9.7 | 1.07 | 1.09 |
| 9.8 | 1.045 | 1.03 |
| 9.9 | 1.025 | 1.04 |
| 10.0 | 1.06 | 1.07 |
| 10.1 | 1.09 | 1.07 |
| 10.2 | 1.10 | 1.05 |
| 10.3 | 1.08 | 1.03 |
| 10.4 | 1.07 | 1.06 |
| 10.5 | 1.11 | 1.09 |
| 10.6 | 1.12 | 1.11 |

A set of dimensions suitable for a junction according to the invention, for use in the $X_L$ band (in the portion approx. 6.5–8 kmc./sec.) is as follows:

| | Inch |
|---|---|
| Inside dimensions of the H-plane arm **13** and E-plane arm **17**— | |
| Width (*a*) | 1.122 |
| Height (*b*) | 0.561 |
| Inside dimensions of the first and second wave guides **10** and **11**— | |
| Width (*a*) | 1.122 |
| Height (*b*) | 0.280 |

In this case, also, we used "half-height" guide for the first and second guides, for the same reasons as in the first example.

| | Inch |
|---|---|
| Thickness of the septum **12** (approx.) | 0.064 |
| Dimension P (FIG. 2) | 0.926 |
| Dimension X (FIG. 2) | 0.673 |

This was divided as follows:

| | Inch |
|---|---|
| (i) From the transverse plane including the common axis of the H- and E-plane arms to common plane including the forward steps 31.1 and 32.1 | 0.160 |
| (ii) From said first-named plane to the common plane including the intermediate steps 31.2 and 32.2 | 0.513 |

| | Inch |
|---|---|
| Dimension Y (FIG. 2) | 0.413 |
| Dimension D (FIG. 2) | 0,580 |
| Dimension L (FIG. 2) | 1.141 |
| Dimension "*a*" of chamber 23 between the inner septum edge 22 and the forward transformer steps 31.2 and 32.1 | 2.308 |
| Dimension "*a*" (FIG. 6) of the first impedance transformer section | 1.868 |
| Dimension "*a*" of the second, or narrower transformer section | 1.128 |
| Iris elements 13.1 and 13.2 in the H-plane arm 13 projected into the guide approximately | 0.135 |
| Their width axially was | 0.050 |
| And they were spaced from the mid-plane between the wide walls of the first and second guides approximately | 0.242 |
| Iris element 17.1 in the E-plane arm projected into the guide approximately | 0.135 |
| Its width axially was approximately | 0.125 |
| And it was spaced from said mid-plane approximately | 0.412 |

VSWR data was taken on this $X_L$ band device, in the same manner as is set forth in connection with Table I, and it was found that the VSWR was less than 1.07 in each of the E- and H-plane arms, throughout the frequency band from 6.7 kmc./sec. to 8.1 kmc./sec.

FIG. 12 is a view on the same sectional line as FIG. 3 of a modification of the device shown in FIGS. 2, 3 and 4, in which the H-plane arm 13.9 is made of a first block 43 of metal, and the E-plane arm 17.9 is made of a second 47 block of metal. Otherwise, the device of FIG. 12 is the same as that shown in FIG. 3, and like parts in each figure bear the same reference characters. The blocks 43 and 47 have the same outer cross-sectional dimensions, which correspond to the cross-sectional dimensions of the normally-used waveguide connecting flanges (not shown), which are well known. The E- and H-plane arms are apertures 17.9 and 13.9, respectively, in these blocks. The projection of each block from the outer wide walls 14, 15 and 18, 19, respectively, of the first and second guides is only the amount necessary to define the respective E- or H-plane arm contained in it. For example, in an $X_S$ band device, the axial length 0.750 inch mentioned above for each of these arms will be sufficient. Thus, the total distance between the outermost surfaces of the blocks 43 and 47 (parallel to the wide walls of the first and second guides 10, 11) may be as little as $2\times0.750+0.225$ or 1.725 inches plus the combined wall thickness of the wide walls 14 and 18, or 15 and 19 of the first and second guides, in the case where the latter guides are half-height guides; i.e. less than two inches. Likewise, the total length of the first or second waveguide 10 or 11, respectively, may be as small as two inches. It will be appreciated that the invention can be realized in an extremely compact and rugged structure.

FIG. 13 shows the general arrangement of four rectangular waveguides in another hybrid T junction according to the invention. First and second rectangular waveguides 50 and 51, respectively, are joined in a single structure with a septum 52 forming a common wide wall. It will be understood that the guides 50 and 51 may have separate wide walls joining each other at least in part to form the septum 52. A third rectangular waveguide 53 is mounted on one pair 54, 55 of the adjacent non-common coplanar narrow walls of the ends of the first and second guides 50 and 51, respectively, at the same said ends, 50.1 and 51.1, respectively, with its broad or wide walls perpendicular to the septum 52, and opening into the first and second guides 50 and 51 through an opening 56. This opening is rectangular and lies equal distances on either side of the septum 52, with its larger dimension transverse to the axes of both of the first and second guides 10 and 11. As so disposed, the third rectangular waveguide 53 may be termed the H-plane arm of the configuration.

A fourth rectangular waveguide 57 is mounted on the remaining pair 58, 59 of the adjacent non-common coplanar narrow walls of the same ends 50.1 and 51.1, respectively, of the first and second guides 50 and 51, respectively, on a common longitudinal axis with the H-plane arm 53 but with its broad walls at right angles to the broad walls of the H-plane arm, and opening into the first and second guides through an opening 60 in said coplanar narrow walls. This opening 60 is rectangular and lies equal distances on either side of the septum 52, with its longer dimension parallel to the axes of the first and second guides 50 and 51. As so disposed, the fourth rectangular waveguide 57 may be termed the "E-plane arm" of the configuration shown.

The septum 52 terminates at an edge 62 near the ends 50.1 and 51.1 of the first and second guides. This edge 62 meets the nearer long boundary 56.1 of the H-plane arm opening 62; it may be straight, as indicated in FIG. 1 in which case the end of the septum 52 near this edge partly overlaps the E-plane ar mopening 60; alternatively, the septum 52 may terminate in a curved edge 62.1 which at one end meets the nearer long boundary 56.1 of the H-plane arm opening, and which is cut back at the other end so that it ends short of the nearer short boundary 60.1 of the E-plane opening 60, as is shown in FIG. 15. The outer end of the ends 50.1 and 51.1 of the first and second guides, opposite the septum edge 62 or 62.1, is provided with a common closure 64, enclosing with the outer walls of the first two guides an open chamber 63 in the junction region between the E-plane and H-plane arms.

FIGS. 14 and 15 show structure of an embodiment of the invention according to the arrangement illustrated in FIG. 13, in which the septum 52 is provided with the curved edge 62.1 adjacent the open chamber 63. It will be appreciated that this embodiment might be furnished with the straight septum edge 62 schematically illustrated in FIG. 13. It will also be appreciated that the chamber 63 may, in practice, be furnished with suitable impedance transformer means, as described and shown in connection with FIGS. 2, 3 and 4, and that the E-plane and H-plane arms 57 and 53, respectively, may be provided with impedance matching means, such as the iris elements shown in FIGS. 2, 3 and 4. These have been omitted from FIGS. 14 and 15 to simplify the illustrations.

Referring to FIGS. 16, 17 and 18, assuming that $TE_{01}$ mode energy is propagating in the E-plane arm 57, as indicated by the voltage vector arrows 57.5, this energy will generate the $TE_{01}$ mode in the chamber 63, propagating toward the first and second guides 50 and 51, respectively, (FIG. 17), and toward the common closure 64 (FIG. 18). If the septum edge 62 extends part way across the opening 60, it will not interfere with the generation of the $TE_{01}$ mode energy in each of the first and second waveguides, as the shorter voltage vector arrows 57.51 indicate in FIG. 16. As FIG. 17 shows, the $TE_{01}$ mode will then propagate in phase in each of the first and second waveguides 50 and 51. The common end closure 64 should be located so that $TE_{01}$ mode energy reflected therefrom will reinforce these waves. For example, it may be located to provide effectively a shorted half-wave stub, like the closure wall 24.2 in FIG. 9. As is indicated above, suitable impedance transformer means may be provided to take account of the fact that the chamber 63 functions here as a rectangular waveguide in the $TE_{01}$ mode having a height which is approximately twice the height of either of the first and second waveguides 50 and 51, respectively. If the septum 52 has the curved edge 62.1 (FIG. 5), then the in-phase $TE_{01}$ mode waves will still be propagated in the first and second guides, and only the impedance seen by the E-plane arm 57 looking into the chamber 63 will be different.

Referring to FIG. 19, and assuming that $TE_{01}$ mode energy is propagating in the H-plane arm 53, as indicated by the intermediate voltage vector arrow 53.5 in the opening 56, the edge 62 of the septum 52 adjacent the nearer edge 56.1 of the opening distorts the wave field to provide voltage vectors curving into mutually opposite directions from the septum edge, as indicated by the two oppositely directed voltage vector arrows 53.51 and 53.52, respectively. These will generate mutually out-of-phase $TE_{01}$ mode wave energy in the first and second waveguides 50 and 51, respectively. However, these oppositely-directed voltage waves cannot propagate toward the common end closure 64 because in that direction the chamber 63 lacks the septum 52 and such mutually opposite voltages cancel each other.

The embodiments of the invention which have been illustrated and described herein are but a few illustrations of the invention. Other embodiments and modifications will occur to those skilled in the art. For example, full height waveguide may be used in embodiments according to FIG. 1, instead of the half height guide herein illustrated. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. A waveguide junction comprising first and second parallel rectangular guides having a common narrow wall, a third rectangular guide branchingly connected to one pair of the adjacent non-common coplanar wide walls of said first and second guides at the same ends and electrically communicating with and opening into said first and second guides, said third guide positioned with respect to said first and second guides to propagate only transverse electric waves mutually out-of-phase in said first and second guides, a fourth rectangular guide branchingly connected to the remaining pair of the adjacent non-common coplanar wide walls of said first and second guides at the same said ends and electrically communicating with and opening into said first and second guides, said fourth guide positioned with respect to said first and second guides to propagate only transverse electric waves mutually in-phase in said first and second guides, said third and fourth guides extending in opposite directions from said ends of said first and second guides along a common axis substantially perpendicular to the axes of said first and second guides, and a common conductive closure for said ends, said common wall terminating a distance away from said closure to provide an open region common to all said guides, said common region being traversed by said common axis, the wide dimension of said common region being progressively reduced, from the termination of said common wall to said closure, to provide that the $TE_{02}$ mode substantially will not propagate in said common region.

2. A waveguide junction comprising first and second parallel rectangular guides having a common narrow wall, a third rectangular guide branchingly connected to one pair of the adjacent non-common coplanar wide walls of said first and second guides at the same ends and electrically communicating with and opening into said first and second guides, said third guide positioned with respect to said first and second guides to propagate only transverse electric waves mutually out-of-phase in said first and second guides, a fourth rectangular guide branchingly connected to the remaining pair of the adjacent non-common coplanar wide walls of said first and second guides at the same said ends and electrically communicating with and opening into said first and second guides, said fourth guide positioned with respect to said first and second guides to propagate only transverse electric waves mutually in-phase in said first and second guides, said third and fourth guides extending in opposite directions from said ends of said first and second guides along a common axis substantially perpendicular to the axes of said first and second guides, and a common conductive closure for said ends, said common wall terminating a distance away from said closure to provide an open region common to all said guides, said common region being traversed by said common axis, the wide dimension of said common region being progressively reduced, from the termination of said common wall to said closure, to provide that the $TE_{02}$ mode substantially will not propagate in said common region, said closure being spaced from said common axis substantially one-half guide wavelength in the fundamental rectangular mode of microwave energy at the mid-band frequency of the operating frequency band of said junction.

3. A waveguide junction comprising first and second parallel rectangular guides having a common narrow wall, a third rectangular guide branchingly connected to one pair of the adjacent non-common coplanar wide walls of said first and second guides at the same ends and electrically communicating with and opening into said first and second guides, said third guide positioned with respect to said first and second guides to propagate only transverse electric waves mutually out-of-phase in said first and second guides, a fourth rectangular guide branchingly connected to the remaining pair of the adjacent non-common coplanar wide walls of said first and second guides at the same said ends and electrically communicating with and opening into said first and second guides, said fourth guide positioned with respect to said first and second guides to propagate only transverse electric waves mutually in-phase in said first and second guides, said third and fourth guides extending in opposite directions from said ends of said first and second guides along a common axis substantially perpendicular to the axes of said first and second guides, and a common conductive closure for said ends, said common narrow wall terminating a distance from said common axis which distance is substantially one-half guide wavelength in the fundamental rectangular mode of microwave energy at the mid-band frequency of the operating frequency band of said junction, the dimension of the region enclosed by said first and second guides between said closure and the termination of said common narrow wall, parallel to the wide walls and transverse to the axes of said first and second guides, being progressively reduced to a value at which the $TE_{02}$ mode will not propagate in said region.

4. A waveguide junction comprising first and second parallel rectangular guides having a common narrow wall, a third rectangular guide branchingly connected to one pair of the adjacent non-common coplanar wide walls of said first and second guides at the same ends and electrically communicating with and opening into said first and second guides, said third guide positioned with respect to said first and second guides to propagate only transverse electric waves mutually out-of-phase in said first and second guides, a fourth rectangular guide branchingly connected to the remaining pair of the adjacent non-common coplanar wide walls of said first and second guides at the same said ends and electrically communicating with and opening into said first and second guides, said fourth guide positioned with respect to said first and second guides to propagate only transverse electric waves mutually in-phase in said first and second guides, said third and fourth guides extending in opposite directions from said ends of said first and second guides along a common axis substantially perpendicular to the axes of said first and second guides, and a common conductive closure for said ends, said common narrow wall terminating a distance from said common axis which distance is substantially one-half guide wavelength in the fundamental rectangular mode of microwave energy at the mid-band frequency of the operating frequency band of said junction, the dimension of the region enclosed by said first and second guides between said closure and the termination of said common narrow wall, parallel to the wide walls and transverse to the axes of said first and second guides, being progressively reduced to a value at which the $TE_{02}$ mode will not propagate in said region, said closure being spaced a distance from said common axis which is electrically substantially the same as said first-named distance.

5. A waveguide junction comprising first and second parallel rectangular waveguides joined in a single structure with a septum forming a common wide wall, a third rectangular waveguide mounted on one pair of the adjacent non-common coplanar narrow walls of the first and second guides at the same ends, said third guide having its wide walls perpendicular to said septum and opening into the first and second guides through a first opening in said non-common coplanar narrow walls, said opening being rectangular and lying equal distances on either side of said septum, with its larger dimension transverse to the axes of said first and second guides, a fourth rectangular waveguide mounted on the remaining pair of adjacent non-common coplanar narrow walls of the first and second guides at the same said ends on a common longitudinal axis with said third guide, said fourth guide having its broad walls at right angles to the broad walls of said third guide, and opening into the first and second guides through a second rectangular opening in said remaining non-common coplanar narrow walls, said second opening lying equal distances on either side of said septum and having its longer dimension parallel to said axes of said first and second guides, said common longitudinal axis being perpendicular to said axes of said first and second guides, said septum terminating at a curved edge which is contiguous at one end with the nearer long edge of said first opening and does not reach said second opening at the other end, and a common conductive closure for said ends located a prescribed distance on the opposite side of said common longitudinal axis from said septum, said prescribed distance being substantially one-half guide wavelength in the fundamental rectangular mode of microwave energy at the mid-band frequency of the operating frequency band of said junction.

6. A waveguide junction comprising first and second parallel rectangular guides having a common wall, a third rectangular guide branchingly connected to one pair of the adjacent non-common coplanar walls of said first and second guides at the same ends and electrically communicating with and opening into said first and second guides, said third guide positioned with respect to said first and second guides to propagate only transverse electric waves mutually out-of-phase in said first and second guides, a fourth rectangular guide branchingly connected to the remaining pair of the adjacent non-common coplanar walls of said first and second guides at the same said ends and electrically communicating with and opening into said first and second guides, said fourth guide positioned with respect to said first and second guides to propagate only transverse electric waves mutually in-phase in said first and second guides, said third and fourth guides extending in opposite directions from said ends of said first and second guides along a common axis substantially perpendicular to the axes of said first and second guides, and a common conductive closure for said ends defining a common region common to all said guides, the wide dimension of said common region being progressively reduced to a value at which the $TE_{02}$ mode will not propagate in said common region.

7. A waveguide junction comprising first and second parallel rectangular guides having a common wide wall, a third rectangular guide branchingly connected to one pair of the adjacent non-common coplanar narrow walls of said first and second guides at the same ends and electrically communicating with and opening into said first and second guides, said third guide positioned with respect to said first and second guides to propagate only transverse electric waves mutually out-of-phase in said first and second guides, a fourth rectangular guide branchingly connected to the remaining pair of the adjacent non-common coplanar narrow walls of said first and second guides at the same said ends and electrically communicating with and opening into said first and second guides, said fourth guide positioned with respect to said first and second guides to propagate only transverse electric waves mutually in-phase in said first and second guides, said third and fourth guides extending in opposite directions from said ends of said first and second guides along a common axis substantially perpendicular to the axes of said first and second guides, and a common conductive closure for said ends defining a common region common to all said guides, the wide dimension of said common region being progressively reduced to a value at which the $TE_{02}$ mode will not propagate in said common region.

8. A waveguide junction comprising first and second parallel rectangular guides having a common wide wall, a third rectangular guide branchingly connected to one pair of the adjacent non-common coplanar narrow walls of said first and second guides at the same ends and electrically communicating with and opening into said first and second guides, said third guide positioned with respect to said first and second guides to propagate only transverse electric waves mutually out-of-phase in said first and second guides, a fourth rectangular guide branchingly connected to the remaining pair of the adjacent non-common coplanar narrow walls of said first and second guides at the same said ends and electrically communicating with and opening into said first and second guides, said fourth guide positioned with respect to said first and second guides to propagate only transverse electric waves mutually in-phase in said first and second guides, said third and fourth guides extending in opposite directions from said ends of said first and second guides along a common axis substantially perpendicular to the axes of said first and second guides, and a common conductive closure for said ends defining a common region common to all said guides, the wide dimension of said common region being progressively reduced to a value at which the $TE_{02}$ mode will not propagate in said common region, said closure being spaced from said common axis substantially one half guide wavelength in the fundamental rectangular mode of microwave energy at the mid-band frequency of the operating frequency band of said junction.

References Cited by the Examiner

UNITED STATES PATENTS 2,643,295 6/53 Lippmann et al. -------- 333—11
2,973,486 2/61 Salzberg -------------- 333—11

HERMAN KARL SAALBACH, *Primary Examiner.*